(12) United States Patent
De Dominicis et al.

(10) Patent No.: US 7,045,016 B2
(45) Date of Patent: May 16, 2006

(54) USE OF MONO- AND BIFUNCTIONAL (PER) FLUOROPOLYETHER DERIVATIVES IN THE TREATMENT OF CERAMIC MATERIALS

(75) Inventors: Mattia De Dominicis, Padua (IT); Gabriella Carignano, Milan (IT)

(73) Assignee: Solvay Solexis, S.p.A., Milan (IT)

( * ) Notice: Subject to any disclaimer, the term of this patent is extended or adjusted under 35 U.S.C. 154(b) by 0 days.

(21) Appl. No.: 09/794,090

(22) Filed: Feb. 28, 2001

(65) Prior Publication Data

US 2001/0025095 A1 Sep. 27, 2001

(30) Foreign Application Priority Data

Feb. 29, 2000 (IT) ............................ MI2000A0379

(51) Int. Cl.
*B08B 7/04* (2006.01)
(52) U.S. Cl. ................ 134/4; 106/287.13; 106/287.14; 106/287.29
(58) Field of Classification Search ..................... 134/4; 106/287.13, 287.14, 287.29
See application file for complete search history.

(56) References Cited

U.S. PATENT DOCUMENTS

| 5,294,364 A | * | 3/1994 | Thomas et al. ............. 510/101 |
| 5,395,657 A | * | 3/1995 | Strepporola et al. ...... 427/393.6 |
| 5,676,938 A | * | 10/1997 | Kimura et al. ........... 424/78.03 |
| 5,895,781 A | * | 4/1999 | Neumiller et al. .......... 510/238 |
| 5,910,475 A | * | 6/1999 | Neumiller et al. .......... 510/238 |
| 5,919,527 A | * | 7/1999 | Fitzgerald et al. ....... 427/389.7 |
| 6,221,434 B1 | * | 4/2001 | Visca et al. .............. 427/393.4 |

FOREIGN PATENT DOCUMENTS

| EP | 0 603 697 | 6/1994 |
| EP | 0 844 265 | 5/1998 |
| JP | 9-272736 | * 10/1997 |
| JP | 11-246330 | * 9/1999 |

OTHER PUBLICATIONS

English Language Translation JP9-272736 (Machine Generated).*
English Language Translation JP 11-246330 (Machine Generated).*
Abstract DE 4041607 Jul. 2, 1992.*
Definition "terracotta", Webster's New Collegiate Dictionary, 1980.*

* cited by examiner

*Primary Examiner*—Margaret G. Moore
(74) *Attorney, Agent, or Firm*—Arent Fox PLLC

(57) ABSTRACT

Use in the treatment of ceramic materials for obtaining an easy stain removal, of mono- and bifunctional (per)fluoropolyether derivatives having the following structures:

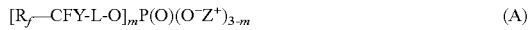

(A)

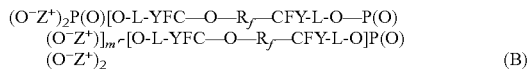

(B)

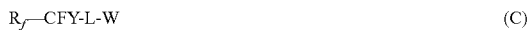

(C)

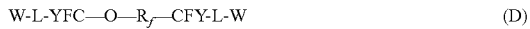

(D)

wherein m' is an integer from 0 to 20, preferably from 0 to 4;
L is an organic group selected from —CH$_2$-(OCH$_2$CH$_2$)$_n$—, —CO—NR'—(CH$_2$)$_q$—, with R'=H or C$_1$–C$_4$ alkyl group;
n=0–8, preferably 1–3, q=1–8, preferably 1–3;
Z=H, alkaline metal or NR$_4$ group with R=H or C$_1$–C$_4$ alkyl group;
Y=F, CF$_3$; m=1,2,3, preferably 1,2;
W is a —Si(R$_1$)$_\alpha$(OR$_2$)$_{3-\alpha}$ group with $\alpha$=0,1,2, R$_1$ and R$_2$ equal to or different from each other are C$_1$–C$_6$ alkyl groups, optionally containing one or more ether O, C$_6$–C$_{10}$ aryl groups, C$_7$–C$_{12}$ alkyl-aryl or aryl-alkyl groups.

17 Claims, No Drawings

USE OF MONO- AND BIFUNCTIONAL (PER) FLUOROPOLYETHER DERIVATIVES IN THE TREATMENT OF CERAMIC MATERIALS

The present invention relates to the use of compounds for the protective treatment of ceramic materials towards stains.

Specifically, the invention relates to the application on ceramic surfaces of specific (per)fluoropolyether compounds able to supply an easy stain removal. Said compounds are effectively usable at very low surface concentrations, without modifying the surface aspect of the ceramic material. The stains which are to be removed are represented by wine, coffee, coca-cola, vinegar, marking pens, potassium permanganate, iodine tincture, sealing agents, etc. Preferably, the materials on which the compounds of the invention are applied are the so called porcelainized gres which due to their surface structure show particular problems as regards the removal of the above mentioned stains.

The technical problem which the present invention intends to solve is not the one which considers oil- and hydro-repellent protective coatings, but the one which warrants an easy stain removal, once the porcelainized gres after treatment with the compounds of the invention, has been dirtied by stains. High hydro- and oil-repellence values of a protective surface treatment do not necessarily represent a sufficient condition to warrant an easy removal of the above mentiond stains, once penetrated into the ceramic material porosities.

It is well known that the ceramic material dirtability is connected to their porosity and therefore to the stain penetration inside the pores. The removal of said agents, once penetrated, is then not possible with the usual washing systems and requires the use of aggresive chemical agents which can damage the ceramic material and must be carefully handled.

Various systems for the protective treatment of ceramic materials are known in the prior art. The surface protection can be obtained through polymer coatings which tend to form a protective film on the material surface, or by the formation of glass coatings obtained by a baking phase. Another method consists in the impregnation of the surface porosities with formulations containing polymer derivatives and silicate particles.

The use of polymer coatings to confer protection to ceramic surfaces is described for example in U.S. Pat. No. 5,919,527 wherein a coating based on fluorinated acrylic polymers is used to give hydro- and oil-repellence and anti-stain properties to hard surfaces, such as for example marbles, granites, ceramics. The method described in this patent causes the formation of polymer films which tend to close the surface porosities of the ceramic material. Said system has the drawback to modify the surface aspect of the ceramic material, besides, due to wear effect, cracking phenomena of the polymer film can take place. They furtherly worsen the surface aspect of the ceramic material.

The surface protection by glass coatings is described for example in U.S. Pat. No. 5,702,761 wherein the protection of porous ceramic articles is obtained by the formation of a silica particle layer containing binding agents. After this first step, a baking at high temperature (T=370–550° C.) is carried out which allows to obtain a protective glass coating. Such application system involves an high energy consumption and it generally implies the change of the surface aspect of the ceramic material due to the refraction index variation caused by the presence of the glass surface layer.

In U.S. Pat. No. 5,356,716 porous materials, such as stones, cements, ceramics are treated by impregnation of the porosities by using a formulation consisting of a mixture comprising polyurethane, silicone resins and silicates. With said a system an improved hydro-repellence is obtained. No mention is made to the easy removal of the above mentioned stains.

The surface treatment of various types of material with (per)fluoropolyether compounds having non reactive or functionalized end groups, is also known. Generally values referred to the hydro- and oil-repellence properties are reported, but examples on the easy removal of the above mentioned stains on ceramic materials, in particular porcelainized gres, are not reported.

The protective systems of the prior art allow to confer hydro- and oil-repellence properties to various supports, but they do not give indications on the easy stain removal from ceramic supports, in particular porcelainized gres, of stains, such as for example wine, vinegar, marking pen, etc. as above mentioned.

The need was therefore felt to have available a protection coating of porous ceramic supports, in particular porcelainized gres, able to supply an easy stain removal, avoiding to change the surface aspect of the ceramic material, without having the above mentioned drawbacks of the prior art systems.

It is therefore an object of the invention the use in the treatment of ceramic materials for obtaining an easy stain removal, of mono- and bifunctional (per)fluoropolyether derivatives having the following structures:

  (A)

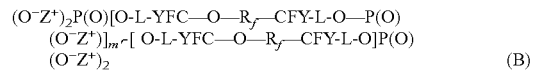  (B)

  (C)

  (D)

wherein m' is an integer from 0 to 20, preferably from 0 to 4;

L is an organic group selected from $-CH_2-(OCH_2CH_2)_n-$, $-CO-NR'-(CH_2)_q-$, with R'=H or $C_1-C_4$ alkyl group;

n=0–8, preferably 1–3, q=1–8, preferably 1–3;

Z=H, alkaline metal or $NR_4$ group with R=H or $C_1-C_4$ alkyl group;

Y=F, $CF_3$;

m=1,2,3, preferably 1,2;

W is a $-Si(R_1)_\alpha(OR_2)_{3-\alpha}$ with $\alpha$=0,1,2, $R_1$ and $R_2$ equal to or different from each other are $C_1-C_6$ alkyl groups, optionally containing one or more ether O, $C_6-C_{10}$ aryl groups, $C_7-C_{12}$ alkyl-aryl or aryl-alkyl groups.

Rf has a number average molecular weight in the range 350–8,000, preferably 500–3,000 and comprises repeating units having at least one of the following structures, statistically placed along the chain:

(CFXO), ($CF_2CF_2O$), ($CF_2CF_2CF_2O$), ($CF_2CF_2CF_2CF_2O$), ($CR_4R_5CF_2CF_2O$), ($CF(CF_3)CF_2O$), ($CF_2CF(CF_3)O$), where

X=F, $CF_3$;

$R_4$ and $R_5$, equal to or different from each other, are selected from H, Cl, or perfluoroalkyl from 1 to 4 carbon atoms.

In particular Rf can have one of the following structures:
1) —$(CF_2O)_{a'}$—$(CF_2CF_2O)_{b'}$—
   with a'/b' in the range 0.5–2, extremes included, a' and b' being integers such as to give the above mentioned molecular weight;
2) —$(C_3F_6O)_{r}$—$(C_2F_4O)_{b}$—$(CFXO)_{t}$—
   with r/b=0.5–2.0; (r+b)/t is in the range 10–30, b, r and t being integers such as to give the above mentioned molecular weight, X has the above mentioned meaning;
3) —$(C_3F_6O)_{r'}$—$(CFXO)_{t'}$—
   t' can be 0;
   when t' is different from 0 then r'/t'=10–30, r' and t' being integers such as to give the above mentioned molecular weight; X has the above mentioned meaning;
4) —$(OCF_2CF(CF_3))_{z}$—$OCF_2(R'f)_{y}$—$CF_2O$—$(CF(CF_3)CF_2O)_{z}$—
   wherein z is an integer such that the molecular weight is the above mentioned one;
   y is an integer between 0 and 1 and R'f is a fluoroalkylene group having for example 1–4 carbon atoms;
5) —$(OCF_2CF_2CR_4R_5)_{q}$—$OCF_2(R'f)_{y}$—$CF_2O$—$(CR_4R_5CF_2CF_2O)_{s}$—
   wherein:
   q and s are integers such that the molecular weight is the above mentioned one;
   $R_4$, $R_5$, R'f, y have the above mentioned meaning;
6) —$(C_3F_6O)_{r'''}$—$(CFXO)_{t'''}$—$OCF_2(R'f)_{y}$—$CF_2O(CF(CF_3)CF_2O)_{r'''}(CFXO)_{t'''}$—
   wherein r'''/t'''=10–30, r''' and t''' being integers such as to give the above mentioned molecular weight;
   R'f and y having the above mentioned meaning.
   In the above indicated formulas:
   —$(C_3F_6O)$— can represent units of formula —$(CF(CF_3)CF_2O)$— and/or —$(CF_2$—$CF(CF_3)O)$—
   In the structures (A) and (C) wherein Rf is monofunctional, the other end group is of the T-O— type, wherein T is a (per)fluoroalkyl group selected from: —$CF_3$, —$C_2F_5$, —$C_3F_7$, —$CF_2Cl$, —$C_2F_4Cl$, —$C_3F_6Cl$; optionally one or two F atoms, preferably one, can be replaced by H.

Also binary, ternary and quaternary mixtures of the above indicated compounds (A), (B), (C) and (D) can be used.

The above fluoropolyethers are obtainable by the well known processes in the prior art, see for example the following patents herein incorporated by reference: U.S. Pat. Nos. 3,665,041, 2,242,218, 3,715,378, and EP 239123. The functionalized fluoropolyethers having hydroxyl termination are for example obtained according to EP 148482, U.S. Pat. No. 3,810,874.

The monofunctional (per)fluoropolyether phosphates synthesis of structure (A) can be carried out by reacting the corresponding hydroxy-terminated (per)fluoroalkylenoxides with $POCl_3$. To obtain the monoester derivative (m=1) it is necessary to use a molar ratio $POCl_3$/hydroxy-terminated compound in the range 2/1–10/1, preferably 6/1–8/1. The reaction is carried out by slowly dropping the hydroxy-terminated compound in $POCl_3$, at a temperature between 50 and 100° C., preferably between 70 and 80° C., removing the HCl vapours by a KOH trap. The $POCl_3$ excess is removed by distillation while the formed adduct is hydrolysed by $H_2O$. The separation of the obtained product takes place by extraction with a suitable organic solvent, such as for example ethyl acetate. The compound of structure (A) with m=1 is separated from the organic phase according to known techniques, for example by solvent evaporation.

To obtain the biester derivative (m=2) of formula (A) one proceeds as in the monoester case with the difference that after the $POCl_3$ removal, the reaction adduct is furtherly reacted with an equimolar amount of hydroxy-terminated compound. Subsequently hydrolysis is carried out and one proceeds as above described.

To obtain the triester derivative (m=3) of formula (A) one proceeds as in the monoester case with the difference that after the $POCl_3$ removal, the reaction adduct is furtherly reacted with a bimolar amount of hydroxy-terminated compound. Subsequently hydrolysis is carried out and one proceeds as above described.

The preparation of the bifunctional (per)fluoropolyether phosphates of structure (B) can be carried out by reacting the corresponding di-hydroxy-terminated (per)fluoroalkylenoxides with $POCl_3$. To obtain the derivative with m'=0, it is necessary to use a molar ratio $POCl_3$/di-hydroxy-terminated compound in the range 4/1–20/1, preferably 12/1–16/1. The reaction is carried out by slowly dropping the hydroxy-terminated compound in $POCl_3$, at a temperature between 50 and 100° C., preferably between 70 and 80° C., removing the HCl vapours by a KOH trap. The $POCl_3$ excess is removed by distillation while the formed adduct is hydrolysed by $H_2O$. The separation of the compound (B) with m'=0 takes place by extraction with a suitable organic solvent, such as for example ethyl acetate. The compound is separated from the organic phase according to known thecniques, for example by solvent evaporation.

To obtain the compound of structure (B) with m'>0, one proceeds as in the case m'=0 with the difference that after the $POCl_3$ removal, the reaction adduct is furtherly reacted with variable amounts of the di-hydroxy-terminated compound. Subsequently hydrolysis is carried out and the above described procedure is performed.

The (per)fluoropolyether silanes of structures (C) and (D) are known compounds, and can be prepared for example according to U.S. Pat. No. 4,094,911, U.S. Pat. No. 4,818,619.

The Applicant has surprisingly found that by using the above defined (per)fluoropolyether derivatives, it is possible to obtain an effective removal of the stains of ceramic materials, without using filming polymer coatings and obtaining an high durability of the protective treatment, even over 6 months. Without to be bound to any theory, the Applicant thinks that the results of the invention are due to the capability of the compounds to penetrate into the porosities of the ceramic materials, to chemically interact with the metal ions present in the ceramic material, thus obtaining a lasting protection.

The (per)fluoropolyether derivatives of the invention exert a very effective protective action in the case of stains represented for example by wine, coffee, coca-cola, vinegar, black marking pen, potassium permanganate (see the Examples). The most aggressive agents are the black marking pen, which can be considered as the most meaningful stain, and $KMnO_4$. Other stains towards which the use of the (per)fluoropolyether compounds of the invention has given positive results are the iodic solution commonly used in hospitals as a disinfectant and the material used as sealing agent for the tile interstices.

In particular for all the above mentioned stains, the best results are obtained by using the bifunctional (per)-fluoropolyether phosphates of structure (B) wherein m' is preferably 0 or 1 and $R_f$ has structure 1) The (per)fluoropolyether compounds of the invention can be easily applied by brushing, spraying, padding by using formulations comprising water or solvents having a low environmenntal impact. The application easiness of the (per)fluoro-polyethers of the invention, the obtained high protective results and the maintaining of the external aspect of the ceramic material, allow to use such invention in various application fields from the industrial ones to the domestic ones, where the protective treatment relates to the tile protection, or bath and kitchen accessories in ceramic material.

The (per)fluoropolyether phosphates of structure (A) and (B) can be used both in acid form ($Z^+=H^+$), and salified with an alkaline metal hydroxide ($Z^+=M^+$, with M=Li, Na, K, etc.) or with ammonia or with an amine ($Z^+=N(R)_4^+$).

The (per)fluoropolyether phosphates of structure (A) and (B) can be formulated in water, in solvents or in water/solvent mixtures. Solvents, or mixtures of solvents, suitable to the purpose can be selected from the following classes: aliphatic alcohols having from 1 to 6 carbon atoms; aliphatic glycols having from 2 to 8 carbon aoms, optionally having an esterified hydroxyl; ketones or esters having from 3 to 10 carbon atoms, etc. Solvent/water mixtures, such as for example ketone/water or alcohol/water mixtures in ratios in the range 10:90—90:10 by volume can also be used.

In the above mentioned formulations the concentration of (per)fluoropolyether phosphates is in the range 0.1–30% by weight with an amount of (per) fluoropolyether compound applied to the ceramic surface in the range 0.1–20 g/m$^2$, depending on the porosity of the material and on the target barrier properties.

The formulated compound can be applied according to the conventional dipping, spraying, brushing, padding methods. After the application the compound is allowed to penetrate into the porosities of the ceramic material for a time ranging from 10 seconds to 2 hours depending on the type of application and of the used formulation. After the solvent evaporation the surface excess of applied compound can be removed by brushing.

The (per)fluoropolyether silanes of structure (C) and (D) can be applied from formulations containing polar solvents, for example alcohols, glycols, or hydrocarbon solvents, wherein the concentration of the compounds of the invention is in the range 0.1–10% by weight. Also in this case, the amount of (per)fluoropolyether compound applied to the ceramic surface is in the range 0.1–20 g/m$^2$. To obtain the best results it is preferable that the polar solvent is combined with a small amount of water, optionally in the presence of a silanization catalyst. Alternatively, a thermal treatment cycle can be used to favour the crosslinking of the applied compound of structure (C) and (D).

In order to favour the removal of the solvent present in the porosities after the application of the formulations comprising the compounds of the invention (A), (B), (C), (D), an additional thermal treatment of the treated surface at a temperature in the range 60–150° C. can follow.

The present invention will be better illustrated by the following Examples, which have a merely indicative but not limitative purpose of the scope of the invention itself.

EXAMPLES

Characterization

Evaluation of the Anti-Stain Properties

The performances of the perfluoropolyether compounds of the invention, deposited by brushing on porcelainized gres tiles at different surface concentrations, are evaluated in terms of easy removal of various stains such as wine, coffee, coca-cola, vinegar and black marking pen (Pentel Pen N50 by Pentel CO., LTD), potassium permanganate KMnO$_4$ (0.1 N solution). The most aggressive agents are the black marking pen, which can be considered as the most meaningful stain and KMnO$_4$.

The stain removal easiness has been evaluated in two different cases by using as removal agents water or ethyl alcohol. A letter concerning the used removal agent is associated: A (water) and S (ethyl alcohol).

The performances concerning the removal easiness of the above mentioned stains have been evaluated by building a visual evaluation scale referred to the stain removal percentage, as shown in Table 1.

TABLE 1

| Stain removal percentage (%) | Associated Number |
| --- | --- |
| 20 | 2 |
| 30 | 3 |
| 40 | 4 |
| 50 | 5 |
| 60 | 6 |
| 70 | 7 |
| 80 | 8 |
| 90 | 9 |
| 100 | 10 |

Example 1

A monofunctional perfluoropolyether (PFPE) phosphate having the structure:

$[Cl(C_3F_6O)_p CF_2CH_2O(CH_2CH_2O)_n]_m P(O)(OH)_{m-3}$ with p=2–5, n=1–4, m=1–3, is used.

The above indicated perfluoropolyether is dispersed at 10% by weight in isopropyl alcohol and applied to smooth porcelainized gres tiles having 5×5 sizes, at room temperature.

For the application of the dispersion a 2.5 ml syringe has been used, depositing different amounts of compound so as to have different final concentrations of the perfluoropolyether for surface unit. In particular the effectiveness of the invention compound in favouring the stain removal has been evaluated at concentrations equal to 0.1 g/m$^2$, 0.5 g/m$^2$, 1 g/m$^2$, 5 g/m$^2$ and 10 g/m$^2$.

After the application step, the compound is allowed to penetrate into the material porosities for 30 seconds, at the end of which the excess of the compound remained on the surface is removed by brushing.

The stain tests are carried out after about 12 hours from the treatment, so as to allow the complete evaporation of the solvent still present in the porosities of the ceramic material. The stains are deposited on the ceramic material and removed after 24 hours by cloth with water (A) or ethyl alcohol (S) when water is not sufficient. The results of the tests are illustrated in Table 2.

TABLE 2

| | PFPE Phosphate Concentrations | | | | |
| --- | --- | --- | --- | --- | --- |
| Stain | 0.1 g/m$^2$ | 0.5 g/m$^2$ | 1 g/m$^2$ | 5 g/m$^2$ | 10 g/m$^2$ |
| Wine | 5A | 6A | 7A | 8A | 10A |
| Coffee | 7A | 8A | 8A | 9A | 10A |
| KMnO$_4$ (0.1 N) | 5S | 6S | 6S | 7S | 7S |
| Coca-cola | 7A | 9A | 10A | 10A | 10A |
| Vinegar | 8A | 9A | 10A | 10A | 10A |
| Black Marking pen | 6A,7S | 7A,8S | 7A,8A | 8A,8S | 8A,9S |

Example 2

A bifunctional perfluoropolyether (PFPE) phosphate is used which is a mixture of the structures reported below:
1) $(HO)_2(O)PO(C_2H_4O)_pCH_2CF_2O(C_2F_4O)_n(CF_2O)_m CF_2CH_2(OC_2H_4)_pOP(O)(OH)_2$
2) $[(HO)_2(O)PO\ (C_2H_4O)_pCH_2CF_2O(C_2F_4O)_n(CF_2O)_m CF_2CH_2(OC_2H_4)_pO]_2P(O)OH$ wherein p=1–4, n=2–4, m=2–6 wherein the compound 1) represents 90% by moles and compound 2) 10% by moles.

The above indicated perfluoropolyether is dispersed at 10% by weight in isopropyl alcohol and applied to smooth porcelainized gres tiles having 5×5 sizes, at room temperature.

The compound application conditions and the stain tests have been carried out likewise to Example 1. The results are illustrated in Table 3.

TABLE 3

| | PFPE Phosphate Concentrations | | | | |
|---|---|---|---|---|---|
| Stain | 0.1 g/m² | 0.5 g/m² | 1 g/m² | 5 g/m² | 10 g/m² |
| Wine | 7A | 7A | 7A | 10A | 10A |
| Coffee | 8A | 8A | 9A | 10A | 10A |
| KMnO₄ (0.1 N) | 6S | 6S | 7S | 8S | 8S |
| Coca-cola | 8A | 10A | 10A | 10A | 10A |
| Vinegar | 8A | 10A | 10A | 10A | 10A |
| Black marking pen | 6A,7S | 7A,8S | 7A,10S | 8A,10S | 9A,10S |

Example 3

A monofunctional perfluoropolyether silane having the structure reported below is used:

wherein p=2–5.

The above mentioned perfluoropolyether is dispersed at 10% by weight in isopropyl alcohol and applied to smooth porcelainized gres tiles having 5×5 sizes, at room temperature.

The compound application conditions have been carried out likewise Example 1, with the difference that after the compound application a thermal treatment is carried out which implies the heating of the ceramic sample in stove at T=80° C. for 2 hours. After such time interval it is possible to remove the surface excess and carry out the stain tests as described in Example 1. The test results are illustrated in Table 4.

TABLE 4

| | PFPE Silane Concentrations | | | | |
|---|---|---|---|---|---|
| Stain | 0.1 g/m² | 0.5 g/m² | 1 g/m² | 5 g/m² | 10 g/m² |
| Wine | 5A | 5A | 7A | 8A | 9A |
| Coffee | 7A | 8A | 8A | 9A | 10A |
| KMnO₄ (0.1 N) | 4S | 5S | 5S | 6S | 6S |
| Coca-cola | 8A | 9A | 10A | 10A | 10A |
| Vinegar | 8A | 9A | 10A | 10A | 10A |
| Black marking pen | 6A,7S | 6A,7S | 7A,8S | 7A,8S | 7A,8S |

Example 4

A bifunctional perfluoropolyether (PFPE) silane having the structure reported below is used:

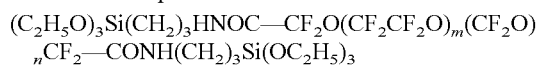

wherein n=2–4, m=2–6

The above mentioned perfluoropolyether is dispersed at 10% by weight in isopropyl alcohol and applied to smooth porcelainized gres tiles having 5×5 sizes, at room temperature.

The compound application conditions and the stain tests have been carried out likewise to Example 3. The results are illustrated in Table 5.

TABLE 5

| | PFPE Silane Concentrations | | | | |
|---|---|---|---|---|---|
| Stain | 0.1 g/m² | 0.5 g/m² | 1 g/m² | 5 g/m² | 10 g/m² |
| Wine | 5A | 7A | 7A | 8A | 9A |
| Coffee | 7A | 8A | 9A | 9A | 10A |
| KMnO₄ (0.1 N) | 4S | 5S | 5S | 6S | 7S |
| Coca-cola | 8A | 10A | 10A | 10A | 10A |
| Vinegar | 8A | 9A | 10A | 10A | 10A |
| Black marking pen | 6A,7S | 6A,7S | 7A,8S | 7A,8S | 7A,8S |

From the results shown in Tables 2–5 it is noticed that the bifunctional perfluoropolyether phosphate results to be the most effective compound in favouring the stain removal from the porcelainized gres tile.

Example 5 (Comparative)

A silicone hydrogenated compound Wacker 090L produced by Wacker Chemie is used.

The above mentioned commercial compound is dispersed at 10% by weight in isopropyl alcohol and applied to smooth porcelainized gres tiles having 5×5 sizes, at room temperature.

The compound application conditions and the stain tests have been carried out likewise to Example 1. The results are illustrated in Table 6, where the results of the stain removal tests are reported in the case of untreated tiles and in the case of tiles treated with said commercial hydrogenated silicone.

TABLE 6

| Stain | Untreated Tile — | Tile treated with silicone Wacker 5 g/m² | Tile treated with silicone Wacker 10 g/m² |
|---|---|---|---|
| Wine | 3A | 5A | 8A |
| Coffee | 5A | 6A | 8A |
| KMnO₄ (0.1 N) | 2S | 3S | 5S |
| Coca-cola | 5A | 7A | 9A |
| Vinegar | 5A | 7A | 9A |
| Black marking pen | 2A,3S | 3A,5S | 5A,7S |

Silicone tends to make a film on the tile surface and tested at a concentration lower than (5 g/m²) has given results not meaningfully superior to those of the untreated tile.

The invention claimed is:

1. A method for removing stains from a ceramic material, comprising
   (a) applying to said ceramic material a (per)fluoropolyether derivative having the following structures:

$(O^-Z^+)_2P(O)[O\text{-}L\text{-}YFC\text{—}O\text{—}R_f\text{—}CFY\text{-}L\text{-}O\text{—}P(O)(O^-Z^+)]_{m'}\text{-}[O\text{-}L\text{-}YFC\text{—}O\text{—}R_f\text{—}CFY\text{-}L\text{-}O]P(O)(O^{31}Z^+)_2$ (B)

$R_f\text{—}CFY\text{-}L\text{-}W$ (C)

$W\text{-}L\text{-}YFC\text{—}O\text{—}R_f\text{—}CFY\text{-}L\text{-}W$ (D)

wherein
   m' is an integer from 0 to 20;
   L is a moiety selected from $—CH_2—(OCH_2CH_2)_n—$ and $—CO—NR'—(CH_2)_q—$, the R' group being H or a $C_1$–$C_4$ alkyl group;
   n=0–8, q=1–8;
   Z=H, alkaline metal or $NR_4$ group with R=H or $C_1$–$C_4$ alkyl group;
   Y=F, $CF_3$;
   m=1,2,3;
   W is a $—Si(R_1)_\alpha(OR_2)_{3-\alpha}$ group with $\alpha=0, 1, 2$, $R_1$ and $R_2$ equal to or different from each other are $C_1$–$C_6$ alkyl groups, containing and non containing one or more ether O and substituents selected from $C_6$–$C_{10}$ aryl and $C_7$–$C_{12}$ alkyl-aryl or aryl-alkyl;
   $R_f$ has a number average molecular weight in the range 350–8,000 and comprises repeating units having at least one of the following structures, statistically placed along the chain:
   $(CFXO)$, $(CF_2CF_2O)$, $(CF_2CF_2CF_2O)$, $(CF_2CF_2CF_2CF_2O)$, $(CR_4R_5CF_2CF_2O)$, $(CF(CF_3)CF_2O)$, $(CF_2CF(CF_3)O)$,
   wherein X=F, $CF_3$;
   $R_4$ and $R_5$, equal to or different from each other, are selected from H, Cl, or perfluoroalkyl from 1 to 4 carbon atoms;
   (b) treating said ceramic material with a solvent based staining agent and allowing for complete solvent evaporation from said staining agent;
   (c) applying a water system to remove the stain.

2. The method according to claim 1, wherein Rf is selected from one of the following structures:
   1) $—(CF_2O)_{a'}—(CF_2CF_2O)_{b'}—$
      with a'/b' in the range 0.5–2, extremes included, a' and b' being integers such as to give the above mentioned molecular weight;
   2) $—(C_3F_6O)_r—(C_2F_4O)_b—(CFXO)_t—$
      with r/b=0.5–2.0; (r+b)/t is in the range 10–30, b, r and t being integers such as to give the above mentioned molecular weight, X has the above mentioned meaning;
   3) $—(C_3F_6O)_{r'}—(CFXO)_{t'}—$
      t' can be 0;
      when t' is different from 0 then r'/t'=10–30, r' and t' being integers such as to give the above mentioned molecular weight; X has the above mentioned meaning;
   4) $—(OCF_2CF(CF_3))_z—OCF_2(R'f)_y\text{-}CF_2O—(CF(CF_3)CF_2O)_{z'}—$
      wherein z is an integer such that the molecular weight is the above mentioned one;
      y is either 0 or 1 and R'f is a fluoroalkylene group having 1–4 carbon atoms;
   5) $—(OCF_2CF_2CR_4R_5)_q—OCF_2(R'f)_y\text{-}CF_2O—(CR_4R_5CF_2O)_s—$
      wherein q and s are integers such that the molecular weight is the above mentioned one;
      $R_4$, $R_5$, R'f, y have the above mentioned meaning;
   6) $—(C_3F_6O)_{r'''}—(CFXO)_{t'''}—OCF_2(R'f)_y\text{-}CF_2O(CF(CF_3)CF_2O)_{r'''}—(CFXO)_{t'''}—$
      wherein r'''/t'''=10–30,
      r''' and t''' being integers such as to give the above mentioned molecular weight;
      R'f and y having the above mentioned meaning.

3. The method according to claim 1, wherein in (C) wherein Rf is monofunctional, the other end group is of the T-O— type, wherein T is a (per)fluoroalkyl group selected from: $—CF_3$, $—C_2F_5$, $—C_3F_7$, $—CF_2Cl$, $C_2F_4Cl$, $C_3F_6Cl$.

4. The method according to claim 1, comprising applying mixtures of one, two, or three of the compounds (B), (C) and (D).

5. The method according to claim 1, wherein the stains are selected from wine, coffee, sweet beverages, vinegar, black marking pen, potassium permanganate, and iodic disinfectant solution.

6. The method according to claim 1, comprising applying (per)fluoropolyether phosphates having structure (B) wherein m' is either 0 or 1 and $R_f$ is $—(CF_2O)_{a'}—(CF_2CF_2O)_{b'}—$ with a'/b' in the range 0.5–2, extremes included, a' and b' being integers such that Rf has a number average molecular weight in the range 350–3,000.

7. The method according to claim 1, wherein the compounds of structure (B), (C), and (D) are applied by brushing, dipping, spraying or padding formulations comprising water or solvents having a low environmental impact.

8. The method according to claim 7, wherein the (per)fluoropolyether phosphates of structure (B) is formulated in water, in solvents or in water/solvent mixtures.

9. The method according to claim 7, wherein the solvents are selected from the following classes: aliphatic alcohols having from 1 to 6 carbon atoms; aliphatic glycols having from 2 to 8 carbon atoms; ketones or esters having from 3 to 10 carbon atoms.

10. The method according to claim 9, wherein the solvent/water mixtures have ratios in the range 10:90–90:10 by volume.

11. The method according to claim 1, wherein the concentration of (per)fluoropolyether phosphates (B) is in the range 0.1–30% by weight and is applied to the ceramic surface in an amount in the range 0.1–20 g/m².

12. The method according to claim 1, wherein the (per)fluoropolyether silanes of structure (C) and (D) are applied from formulations containing polar solvents, selected from alcohols, glycols, or hydrocarbon solvents, wherein the concentration of the compounds in the formulation is in the range 0.1–10% by weight, the compound amount applied to the ceramic surface is in the range 0.1–20 g/m².

13. The method according to claim 12, wherein the polar solvent is combined with a small amount of water, optionally in the presence of a silanization catalyst.

14. The method according to claim 1, wherein the treated ceramic material is porcelainized gres.

15. The method according to claim 1, wherein, in the bifunctional (per)fluoropolyether derivatives:
- m' is an integer from 0 to 4;
- n is 1–3;
- q is 1–3; and
- m is 1 or 2.

16. The method according to claim 1, wherein Rf has a number average molecular weight in the range 500–3,000.

17. The method according to claim 1, wherein the washing system is a water system.

* * * * *